(12) United States Patent
Chan et al.

(10) Patent No.: US 9,398,063 B2
(45) Date of Patent: *Jul. 19, 2016

(54) CUSTOMIZING DISTRIBUTION OF AN OPERATING SYSTEM BASED ON DETECTED NETWORK CARRIER BY RETRIEVING DIFFERENCES BETWEEN THE DISTRIBUTED OPERATING SYSTEM AND AN OPERATING SYSTEM CURRENTLY INSTALLED ON A COMPUTING DEVICE

(71) Applicant: NEXTBIT SYSTEMS INC., San Francisco, CA (US)

(72) Inventors: Michael A. Chan, San Francisco, CA (US); Tom Moss, Los Altos, CA (US); Justin Quan, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/157,197

(22) Filed: Jan. 16, 2014

(65) Prior Publication Data

US 2014/0136830 A1 May 15, 2014

Related U.S. Application Data

(63) Continuation of application No. PCT/US2013/062733, filed on Sep. 30, 2013.

(60) Provisional application No. 61/708,794, filed on Oct. 2, 2012.

(51) Int. Cl.
*G06F 9/00* (2006.01)
*H04L 29/06* (2006.01)
(Continued)

(52) U.S. Cl.
CPC *H04L 65/60* (2013.01); *G06F 8/62* (2013.01); *G06F 8/63* (2013.01); *G06F 9/4406* (2013.01);
(Continued)

(58) Field of Classification Search
CPC .................. G06F 17/30011; G06F 17/30286; Y02B 60/188

USPC ............... 726/1; 455/411, 419, 434; 370/338, 370/329; 709/217, 226
See application file for complete search history.

(56) References Cited

U.S. PATENT DOCUMENTS 5,918,016 A  6/1999 Brewer et al.
6,094,531 A  7/2000 Allison et al.
(Continued)

FOREIGN PATENT DOCUMENTS

CN  101692239 A   4/2010
EP  2001194 A2 * 12/2008
(Continued)

OTHER PUBLICATIONS

Non-Final Office Action mailed Mar. 25, 2014 for U.S. Appl. No. 14/157,310 by Chan, M.A., et al., filed Jan. 16, 2014.
(Continued)

*Primary Examiner* — Aurel Prifti

(57) ABSTRACT

Technology disclosed herein includes a method for loading a carrier specific OS onto a computing device depending on what network the computing device is connected to. The computing device detects an identity of a network to which a computing device is connected or is to be connected during a network identification process executed on the computing device. The network can be identified, e.g., by examining a subscriber identification module (SIM) card electronically connected to the computing device. The device then sends a request including the identity of the network to a remote registration service. In turn the device receives an instruction from the remote registration service identifying a distribution of an operating system (OS) specific for the network. After retrieving the OS distribution, the device loads the distribution of the operating system on the computing device.

18 Claims, 6 Drawing Sheets

(51) Int. Cl.

| | | |
|---|---|---|
| *G06F 17/30* | (2006.01) | |
| *H04L 29/08* | (2006.01) | |
| *H04L 12/26* | (2006.01) | |
| *H04L 9/08* | (2006.01) | |
| *H04L 9/32* | (2006.01) | |
| *G06F 9/44* | (2006.01) | |
| *G06F 9/445* | (2006.01) | |
| *H04W 8/24* | (2009.01) | |

(52) U.S. Cl.
CPC .......... *G06F 9/4416* (2013.01); *G06F 17/3007* (2013.01); *G06F 17/3015* (2013.01); *G06F 17/30085* (2013.01); *G06F 17/30091* (2013.01); *G06F 17/30194* (2013.01); *H04L 9/0825* (2013.01); *H04L 9/3226* (2013.01); *H04L 43/04* (2013.01); *H04L 65/4069* (2013.01); *H04L 67/10* (2013.01); *H04L 67/1095* (2013.01); *H04L 67/1097* (2013.01); *H04L 67/2823* (2013.01); *H04L 67/2842* (2013.01); *H04L 67/40* (2013.01); *H04L 67/42* (2013.01); *H04W 8/24* (2013.01); *G06F 17/30011* (2013.01); *G06F 17/30286* (2013.01); *Y02B 60/188* (2013.01)

(56) References Cited

U.S. PATENT DOCUMENTS

| | | | |
|---|---|---|---|
| 6,202,206 B1 | 3/2001 | Dean et al. | |
| 6,292,941 B1 | 9/2001 | Jollands | |
| 6,950,660 B1 | 9/2005 | Hsu et al. | |
| 6,961,568 B2 | 11/2005 | Sugaya | |
| 7,124,409 B2 | 10/2006 | Davis et al. | |
| 7,305,230 B2 | 12/2007 | Zhigang | |
| 7,376,717 B2 | 5/2008 | Bhogal et al. | |
| 7,596,785 B2 | 9/2009 | Burkhardt et al. | |
| 7,614,050 B2 | 11/2009 | Sasaki et al. | |
| 7,620,015 B2 | 11/2009 | Lenzarini | |
| 7,668,938 B1 | 2/2010 | Phillips et al. | |
| 7,698,704 B2 | 4/2010 | Abali et al. | |
| 7,756,955 B2 | 7/2010 | Takagi | |
| 7,757,227 B2 | 7/2010 | Duplessis et al. | |
| 7,810,089 B2 | 10/2010 | Sundarrajan et al. | |
| 7,865,892 B2 | 1/2011 | Motoki et al. | |
| 7,916,707 B2 | 3/2011 | Fontaine | |
| 7,996,498 B2 | 8/2011 | Huang | |
| 8,006,241 B2 | 8/2011 | Dias | |
| 8,060,530 B2 | 11/2011 | Smith | |
| 8,122,174 B2 | 2/2012 | Knowles et al. | |
| 8,214,322 B2 | 7/2012 | Nishio | |
| 8,239,662 B1* | 8/2012 | Nelson ............... | 713/1 |
| 8,266,357 B2 | 9/2012 | Knowles et al. | |
| 8,331,227 B2 | 12/2012 | Tanaka et al. | |
| 8,341,619 B2 | 12/2012 | Pall et al. | |
| 8,352,935 B2 | 1/2013 | Isaacson et al. | |
| 8,365,164 B1 | 1/2013 | Morgenstern | |
| 8,373,538 B1 | 2/2013 | Hildner et al. | |
| 8,559,910 B2 | 10/2013 | Yi et al. | |
| 8,594,631 B2 | 11/2013 | Lemilainen et al. | |
| 8,850,016 B1* | 9/2014 | Karanam et al. ............. | 709/226 |
| 8,850,174 B1 | 9/2014 | Mahmoud et al. | |
| 2002/0083429 A1 | 6/2002 | Rozenfeld et al. | |
| 2002/0103996 A1 | 8/2002 | LeVasseur et al. | |
| 2002/0174232 A1 | 11/2002 | Kikuta et al. | |
| 2003/0027581 A1 | 2/2003 | Jokinen et al. | |
| 2003/0061604 A1* | 3/2003 | Elcock ................ | G06F 9/44547 717/170 |
| 2003/0167405 A1 | 9/2003 | Freund et al. | |
| 2003/0192042 A1 | 10/2003 | Takemoto et al. | |
| 2003/0212824 A1 | 11/2003 | Yoshizawa et al. | |
| 2003/0221122 A1 | 11/2003 | Hatori | |
| 2004/0193702 A1 | 9/2004 | Osborne et al. | |
| 2004/0233930 A1 | 11/2004 | Colby | |
| 2005/0114474 A1 | 5/2005 | Anderson et al. | |
| 2005/0144615 A1 | 6/2005 | Chen et al. | |
| 2006/0178166 A1 | 8/2006 | Luu et al. | |
| 2006/0195839 A1 | 8/2006 | Lin et al. | |
| 2006/0248328 A1 | 11/2006 | Iszlai et al. | |
| 2007/0268877 A1* | 11/2007 | Buckley et al. ............... | 370/338 |
| 2008/0134165 A1 | 6/2008 | Anderson et al. | |
| 2008/0212535 A1 | 9/2008 | Karaoguz et al. | |
| 2008/0287125 A1 | 11/2008 | Hind et al. | |
| 2008/0304458 A1* | 12/2008 | Aghvami et al. ............. | 370/338 |
| 2009/0156254 A1 | 6/2009 | Montes | |
| 2009/0181662 A1* | 7/2009 | Fleischman et al. .......... | 455/419 |
| 2009/0191876 A1 | 7/2009 | Jain et al. | |
| 2010/0017798 A1* | 1/2010 | Burkhardt ................. | G06F 8/61 717/175 |
| 2010/0235833 A1* | 9/2010 | Huang et al. ...................... | 718/1 |
| 2010/0293541 A1 | 11/2010 | Pall et al. ......................... | 717/178 |
| 2010/0316004 A1 | 12/2010 | Macias et al. ................. | 370/329 |
| 2011/0083126 A1* | 4/2011 | Bhakta ....................... | G06F 8/65 717/168 |
| 2011/0110266 A1 | 5/2011 | Li et al. | |
| 2011/0117911 A1* | 5/2011 | Narang et al. ................ | 455/434 |
| 2011/0185354 A1 | 7/2011 | Tanner et al. | |
| 2011/0208929 A1 | 8/2011 | McCann | |
| 2011/0238972 A1* | 9/2011 | Semple et al. .................... | 713/2 |
| 2011/0239210 A1* | 9/2011 | Kotani et al. .................. | 717/171 |
| 2011/0320588 A1 | 12/2011 | Raleigh | |
| 2012/0036552 A1* | 2/2012 | Dare et al. ........................ | 726/1 |
| 2012/0047227 A1* | 2/2012 | Haggerty et al. ............. | 709/217 |
| 2012/0108206 A1* | 5/2012 | Haggerty ...................... | 455/411 |
| 2012/0108207 A1* | 5/2012 | Schell et al. .................. | 455/411 |
| 2012/0174091 A1 | 7/2012 | Tysklind et al. | |
| 2012/0180036 A1 | 7/2012 | Ran et al. | |
| 2012/0265976 A1 | 10/2012 | Spiers et al. | |
| 2012/0266231 A1 | 10/2012 | Spiers | |
| 2012/0322498 A1 | 12/2012 | Nogawa | |
| 2012/0322505 A1* | 12/2012 | Lodeweyckx .................. | 455/558 |
| 2013/0031350 A1* | 1/2013 | Thielen et al. ................. | 713/100 |
| 2013/0091344 A1* | 4/2013 | Doren et al. ...................... | 713/2 |
| 2013/0111460 A1 | 5/2013 | Mohamed et al. | |
| 2013/0318518 A1 | 11/2013 | Paalanen et al. | |
| 2013/0326501 A1* | 12/2013 | Hsiang .................. | G06F 9/5072 717/178 |
| 2014/0013429 A1 | 1/2014 | Lu | |
| 2014/0073291 A1 | 3/2014 | Hildner et al. | |
| 2016/0034273 A1* | 2/2016 | Leupold .................... | G06F 8/71 717/122 |

FOREIGN PATENT DOCUMENTS

| | | | | |
|---|---|---|---|---|
| JP | 2002-530014 A | 9/2002 | | |
| JP | 2003-196135 | 7/2003 | | |
| KR | 10-2008-0077966 | 8/2008 | | |
| WO | WO2013112083 A1 * | 1/2012 | ............ | H04W 16/14 |

OTHER PUBLICATIONS

Non-Final Office Action mailed Apr. 3, 2014, U.S. Appl. No. 14/158,724 by Chan, M.A., et al., filed Jan. 17, 2014.
Non-Final Office Action mailed May 14, 2014, U.S. Appl. No. 14/173,750 by Chan, M.A., et al., filed Feb. 5, 2014.
Co-Pending U.S. Appl. No. 14/042,508 by Chan, M.A., et al., flied Sep. 30, 2013.
Co-Pending U.S. Appl. No. 14/157,310 by Chan, M.A., et al., filed Jan. 16, 2014.
Co-Pending U.S. Appl. No. 14/158,724 by Chan, M.A., et al., filed Jan. 17, 2014.
Co-Pending U.S. Appl. No. 14/173,750 by Chan, M.A., et al., filed Feb. 5, 2014.
Notice of Allowance mailed May 23, 2014, for U.S. Appl. No. 14/157,310 by Chan, M.A., et al., filed Jan. 16, 2014.
International Search Report and Written Opinion of International Application No. PCT/US2013/062733 with a mailing date of Dec. 31, 2013.
Final Office Action mailed Jul. 29, 2014, U.S. Appl. No. 14/158,724 by Chan, M.A., et al., filed Jan. 17, 2014.
Notice of Allowance mailed Sep. 2, 2014, U.S. Appl. No. 14/173,750 by Chan, M.A., et al., filed Feb. 5, 2014.

(56) References Cited

OTHER PUBLICATIONS

Non-Final Office Action mailed Jul. 24, 2015, for U.S. Appl. No. 14/042,508, by Chan, M.A., et al., filed Sep. 30, 2013.
Datta, S.K., et al., "CCT: Connect and Control Things: A novel mobile application to manage M2M devices and endpoints," 2014 IEEE Ninth International Conference on Intelligent Sensors, Sensor Networks and Information Processing (ISSNIP), pp. 1-6 (Apr. 21-24, 2014).
Hansen, J.S., et al., "Dynamic Adaptation of Network Connections in Mobile Environments," IEEE Internet Computing, vol. 2, No. 1, pp. 39-48 (Jan./Feb. 1998).
Itao, T., et al., "A Framework for Adaptive Ubicomp Applications Based on the Jack-in-the-Net Architecture," Wireless Networks, vol. 10, No. 3, pp. 287-299 (May 2004).
Peddemors, A., et al., "A Mechanism for Host Mobility Management supporting Application Awareness," MobiSys '04 Proceedings of the 2nd international conference on Mobile systems, applications, and services, pp. 231-244 (2004).
Notice of Allowance mailed Mar. 13, 2015, U.S. Appl. No. 14/158,724 by Chan, M.A., et al., filed Jan. 17, 2014.

* cited by examiner

CUSTOMIZING DISTRIBUTION OF AN OPERATING SYSTEM BASED ON DETECTED NETWORK CARRIER BY RETRIEVING DIFFERENCES BETWEEN THE DISTRIBUTED OPERATING SYSTEM AND AN OPERATING SYSTEM CURRENTLY INSTALLED ON A COMPUTING DEVICE

CROSS-REFERENCE TO RELATED APPLICATION

This application is a continuation of International Patent Application No. PCT/US2013/062733, entitled "CUSTOMIZING OPERATING SYSTEM BASED ON DETECTED CARRIER", which was filed on Sep. 30, 2013, which claims to the benefit of U.S. Provisional Patent Application No. 61/708,794, entitled "CLOUD COMPUTING INTEGRATED OPERATING SYSTEM", which was filed on Oct. 2, 2012, all of which are incorporated by reference herein in its entirety.

FIELD OF THE INVENTION

At least one embodiment of the present invention pertains to cloud computing, and more particularly, to automatically loading operating system based on network carrier using cloud storage.

BACKGROUND

Wireless devices, e.g., mobile phones, tablets, computers, mobile hotspot devices, etc., are manufactured for use on one or more telecommunication carrier's networks. Sometime, particular carriers apply different requirements which devices must meet in order to operate on the carrier's network. Typically manufactures and vendors of the devices modify the hardware and the software (including, e.g., operating systems) of the devices to meet carrier-specific requirements.

Users of such devices may need or desire to use the same device in communication networks of different telecommunication carriers. For instance, a user can use a mobile phone with a first carrier in one country, and needs to use the same mobile phone with a second carrier in another country when he travels abroad.

SUMMARY

Technology introduced here provides a mechanism for loading a carrier specific OS onto a computing device depending on what network the computing device is connected to. In accordance with the technology introduced here, the computing device detects an identity of a network to which a computing device is connected or is to be connected, during a network identification process executed on the computing device. There are multiple ways a network can be identified, e.g., by examining a subscriber identification module (SIM) card electronically connected to the computing device. The device then sends a request including the identity of the network to a remote registration service. In turn the device receives an instruction from the remote registration service identifying a distribution of an operating system (OS) specific for the network. Once the OS distribution is retrieved, the device loads the distribution of the operating system on the computing device.

Such a mechanism enables a user to start using a device without the need of manually setting up the device first. For instance, when a user receives a new mobile phone or mobile device, the user only needs to insert his SIM card into the device. The device can automatically detect with which network the SIM card works (e.g., which wireless carrier for the network) and correspondingly load an operating system customized for that network. When the mobile device finishes booting up, the user has a new device with a running operating system customized for that network carrier, or even further customized for that user.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
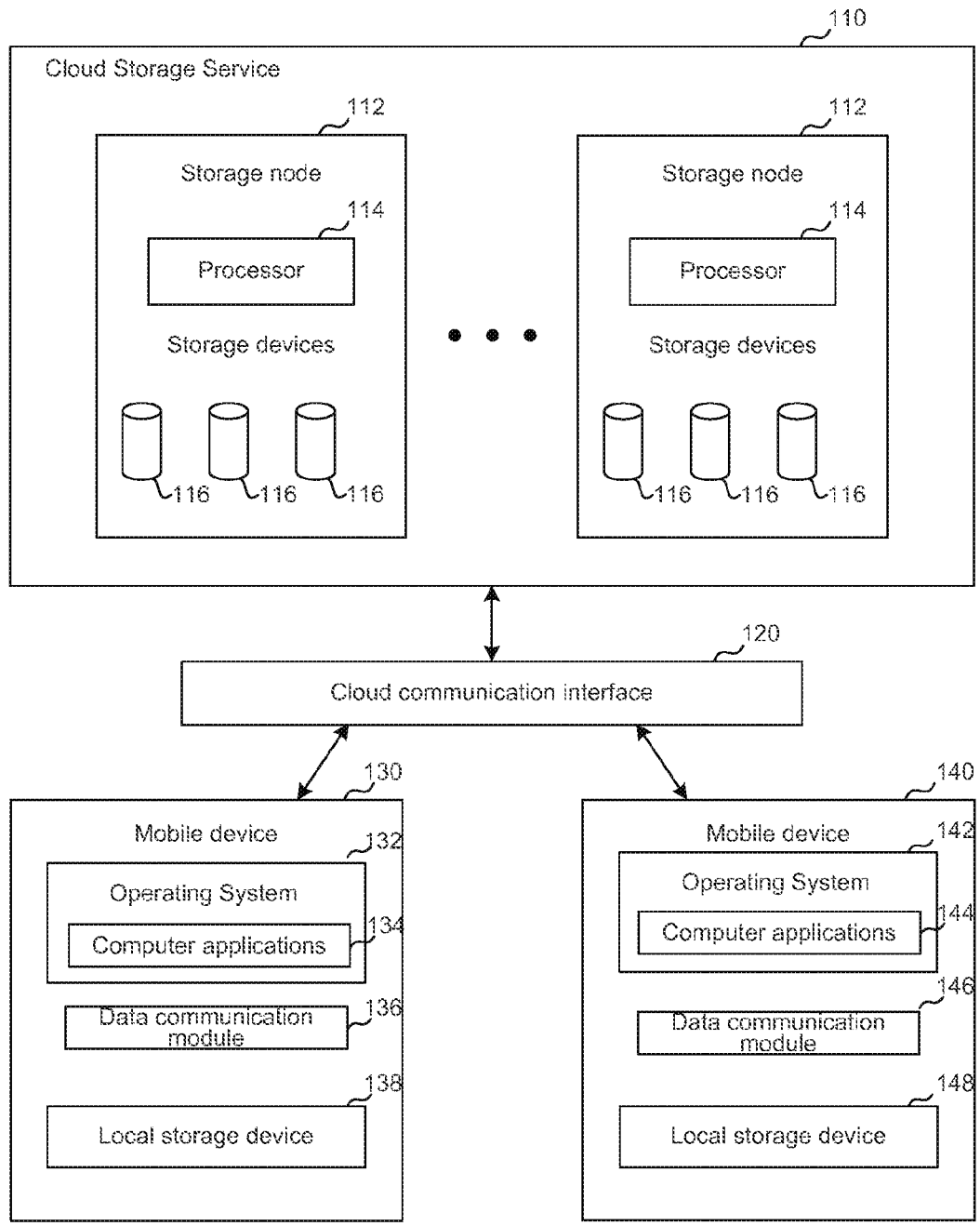
FIG. 1 illustrates an example system for mobile devices retrieving data from a cloud storage service.

FIG. 1 illustrates an example system for mobile devices retrieving data from a cloud storage service. The system includes a cloud storage service 110 configured to store data for mobile devices. In one embodiment, the cloud storage service 110 can be a storage cluster having computer nodes interconnected with each other by a network. The storage cluster can communicate with other mobile devices (e.g., mobile devices 130 or 140) via the Internet. The cloud storage service 110 can contain storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

A cloud communication interface 120 can also be included to receive data to be stored in the cloud storage service. The cloud communication interface 120 can include network communication hardware and network connection logic to receive the information from electronic devices. The network can be a local area network (LAN), wide area network (WAN)

or the Internet. The cloud communication interface 120 may include a queuing mechanism to organize the received synchronization data to be stored in the cloud storage service 110. The cloud communication interface 120 can communicate with the cloud storage service 110 to send requests to the cloud storage service 110 for storing application state data and retrieving data.

A mobile device 130 includes an operating system 132 to manage the hardware resources of the mobile device 130. The mobile device 130 includes at least one local storage device 138 to store the operating system data, application data, and user data. The mobile device 130 can retrieve data from the cloud storage service 110 via the cloud communication interface 120. The mobile device 130 or 140 can be a desktop computer, a laptop computer, a tablet computer, an automobile computer, a game console, a smart phone, a personal digital assistant, a mobile hotspot device, or other electronic devices capable of running computer applications, as contemplated by a person having ordinary skill in the art.

The computer applications 134 stored in the mobile device 130 can include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The mobile device 130 or 140 can download data from the cloud storage service to update or change the operating system 132 or 142 on the mobile device 130 or 140. The mobile device 130 or 140 can download the data using its data communication module 136 or 146. The update or change of the operating system can be triggered by various events. For instance, when the mobile device 130 detects that it has connected to a network service of a different mobile network carrier, the mobile device 130 can request data from the cloud storage service 110 for an operating system designed for the mobile device 130 running on the mobile network carrier.

Figure 2:
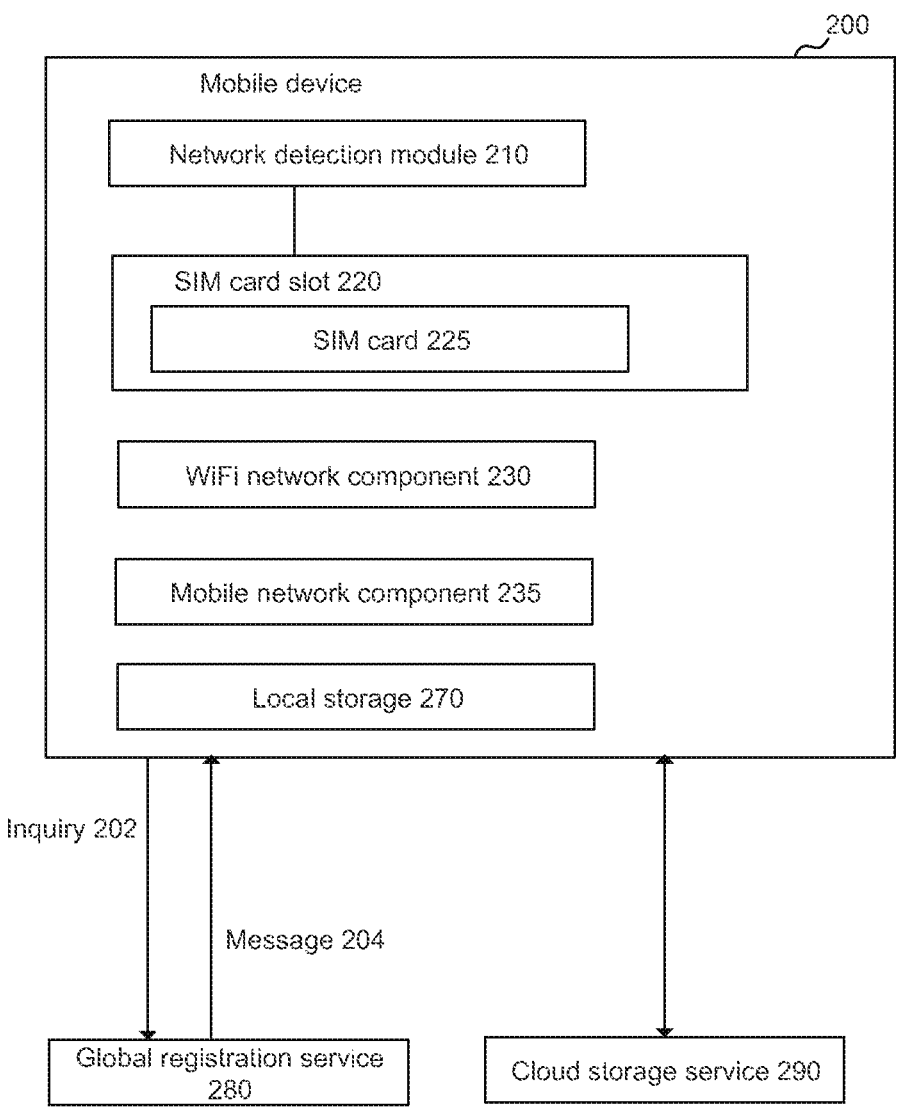
FIG. 2 illustrates an example of a mobile device capable of switching operating system based on the telecommunication carrier.

FIG. 2 illustrates an example of a mobile device capable of switching operating system based on the telecommunication carrier. The mobile device 200 includes a network detection module 210. The network detection module 210 is capable of detecting the network(s) that the mobile device 200 is connected to or can be connected to. For instance, the network detection module 210 can detect whether the mobile device 200 is connected to a home WiFi network, a work WiFi network, or a public WiFi network (e.g. airport WiFi network). For example, the network detection module 210 may determine whether it's connected to a home WiFi network based on the SSID (service set identifier) of the WiFi network or the MAC (media access control) address of the WiFi network gateway.

The network detection module 210 can also detect the mobile network carrier of the mobile network that the mobile device 200 is connected to. For instance, the network detection module 210 is able to detect whether it is connected to an AT&T or T-Mobile mobile network by communicating with a SIM (subscriber identity module) card 225 inserted in a SIM card slot 220 in the mobile device 200. In the illustrated embodiment, the network detection module 210 can request and retrieve an IMSI (international mobile subscriber identity) number or ICCID (Integrated Circuit Card Identifier) number from the SIM card, and use the IMSI number or ICCID number to determine the mobile network that the SIM card is designed to work with.

The network detection module 210 may further perform its network detection functionality when the mobile device 200 boots up and before an operating system launches on the mobile device 200. In some embodiments, the instructions for the network detection can be stored in a firmware or in a Basic Input/Output System (BIOS) of the mobile device 200. The network detection module 210 can also perform its network detection functionality during any operation stages of the mobile device 200.

Once the network detection module 210 detects the identity of the WiFi or mobile network that the mobile device 200 is connected to, the mobile device 200 contacts and sends an inquiry 202 to a global registration service 280 in order to determine the type and distribution of the operating system that the mobile device 210 should run. The global registration service 280 can be implemented on a web server or on a cloud computing service. The inquiry 202 can include the identity of the connected network, an identity of the mobile device 200, or even an identity of the user using the mobile device 200. The global registration service 280 determines a suggestion of a distribution of an operating system based on the information included in the inquiry, and sends a message 204 containing an identity of the suggested distribution of the operating system back to the mobile device 210. The suggested distribution of the operating system can be a version of the operating system customized for the connected network. The inquiry 202 can be sent out via a WiFi network component 230 or a mobile network component 235 that has been connected to a WiFi or mobile network. Likewise, the message 204 can be received via the WiFi network component 230 or the mobile network component 235.

The message 204 sent by the global registration service 280 can include a location link indicating where to retrieve the data of the suggested distribution of the operating system. For instance, the location link may include a network address of a web server or a cloud storage service 290 that stores in the suggested distribution of the operating system. The mobile device 200 is able to download the suggested distribution of the operating system from the cloud storage service 290 located by the location link in the message 204. The cloud storage service 290 can be implemented along with the global registration service 280 within a common cloud computing service. The cloud storage service 290 can also be implemented in a cloud computing service separated from the global registration service 280, as illustrated in FIG. 2.

In some embodiments, a copy of the suggested distribution of the operating system can be stored in a local storage 270 of the mobile device 200. In some embodiments, a copy of the suggested distribution of the operating system can be stored in a web server within the connected mobile network of the mobile network carrier.

The suggested distribution of the operating system can be distributed to the mobile device 200 as an over-the-air update. The mobile device 200 can receive the suggested distribution of the operating system as a full image of the operating system, or as an incremental copy of the operating system including changes on the operating system or changes to the framework or applications in the operating system. In some embodiments, the installation of the OS distribution is mandatory instead of optional. The user cannot refuse, defer, or alter the update using the OS distribution. After the installation of the OS distribution, the mobile device 200 may need to reboot for the update to take effect.

In some embodiments, the suggested OS distribution includes updates that do not require the mobile device 200 to reboot. For instance, the suggested OS distribution can include asset changes, e.g. changes to the visuals of icons and taskbar or pre-load of applications. For these changes, the mobile device 200 can directly apply the updates without the need to reboot.

If there is any data duplication between the current operating system on the mobile device 200 and the suggested OS distribution. The mobile device 200 does not need to retrieve the entire suggested OS distribution. The mobile device 200 may retrieve only the difference between the current operating system on the mobile device 200 and the suggested OS distribution.

Besides detecting the identity of the WiFi or mobile network that the mobile device 200 is connected to, the network detection module 210 may further detect the identity of the subscriber's number that the mobile device 200 is currently using. For instance, the network detections module 210 can detect that the current subscriber's number belong to an account for a corporation. A configuration of the operating system customized for this corporation is automatically pushed to the mobile device 200. The mobile device 200 can then automatically change the look and feel of user interfaces of the mobile device 200, based on the received configuration of the operating system for that corporation account.

Figure 3:
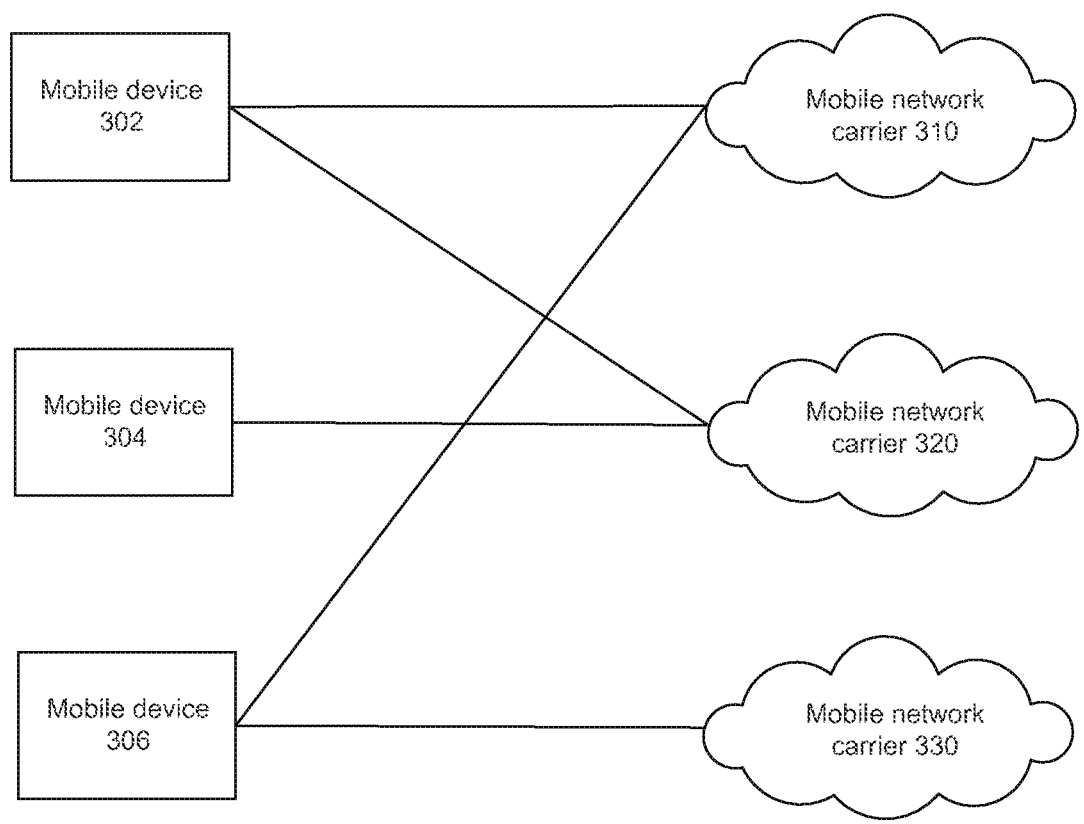
FIG. 3 illustrates an example of a carrier environment with which such mobile devices can switch operating systems based on the network.

The mobile device 200 illustrated in the FIG. 2 can work with multiple mobile network carriers or telecommunication carriers. FIG. 3 illustrates an example of a carrier environment with which such mobile devices can switch operating systems based on the network. Multiple mobile devices 302, 304, 306 can work with one or more of mobile network carriers, 310, 320, 330. For instance, mobile device 302 may be configured to operate with carriers 310 and 320. Mobile device 304 may be configured to operate with carrier 320. Mobile device 306 may be configured to work with carriers 310 and 330. The network detections modules of the mobile devices 302, 304, 306 detect the carriers to which the mobile devices are currently connected. Accordingly, certain suggested OS distribution can be distributed to the mobile devices 302, 304, 306 based on the carriers to which the mobile devices are currently connected and on the particular mobile devices.

Figure 4:
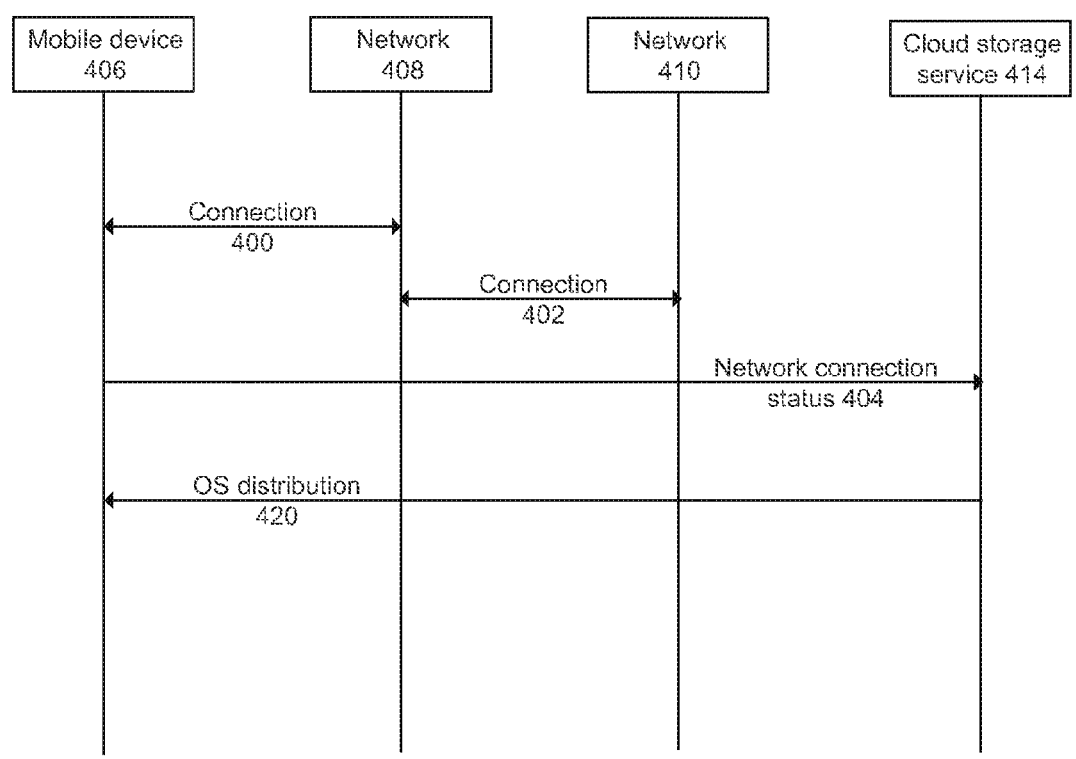
FIG. 4 illustrates an example of a message sequence chart for a mobile device switching between telecommunication networks.

FIG. 4 illustrates an example of a message sequence chart for a mobile device 406 switching between telecommunication networks (also referred to as mobile networks). The mobile device 406 establishes a connection 400 with a network 408 by exchanging handshake messages. The network 408 can be a WiFi network, a mobile phone network, or other type of communication networks. After the establishment of the connection, the mobile device 406 detects that it established another connection 402 with another network 410. This can happen in various situations. For instance, the mobile device 406 may find itself out of the network 408 because it is no longer able to connect to the network 408. Then the mobile device 406 actively locates the network 410 and initiates the handshake process. Alternatively, the mobile device 406 keeps the connection with the network 408 (e.g. a mobile phone network), and then detects another type of network 410 (e.g. a WiFi network). The mobile device initiates the connection to the network 410 in order to be connected with both networks 408 and 410 (e.g., a mobile phone network and a WiFi network).

The network detections module of the mobile device 406 detects that the mobile device established a new connection with the network 410. The mobile device 406 then reports its network connection status 404 to a cloud storage service 414 via the network 410. Alternatively, the mobile device 406 can also report to the cloud storage service 414 via the network 408 if it still connects with the network 408. The network connection status 404 can include information identifying both the mobile device 406 and the network 210.

Once the cloud storage service 414 receives the network connection status 404, it determines a corresponding OS distribution based on the mobile device 406 and the new connection with the network 410. The cloud storage service 414 transmits the OS distribution 420 to the mobile device 406. Alternatively, the cloud storage service 414 can transmit a location of the OS distribution 420 to the mobile device 406. The mobile device 406 can retrieve the OS distribution 420 based on the received location.

The mobile device 406 loads the OS distribution 420 and starts running the operating system. If the OS distribution 420 is a collection of customized user interface tweaks and pre-loaded applications, the mobile device 406 can load the collection as updates to the currently running operating system without restarting the device or operating system. If the OS distribution 420 is an operating system different from the currently running operating system, the mobile device 406 may need to restart (e.g., reboot) the device and then load the OS distribution 420.

Figure 5:
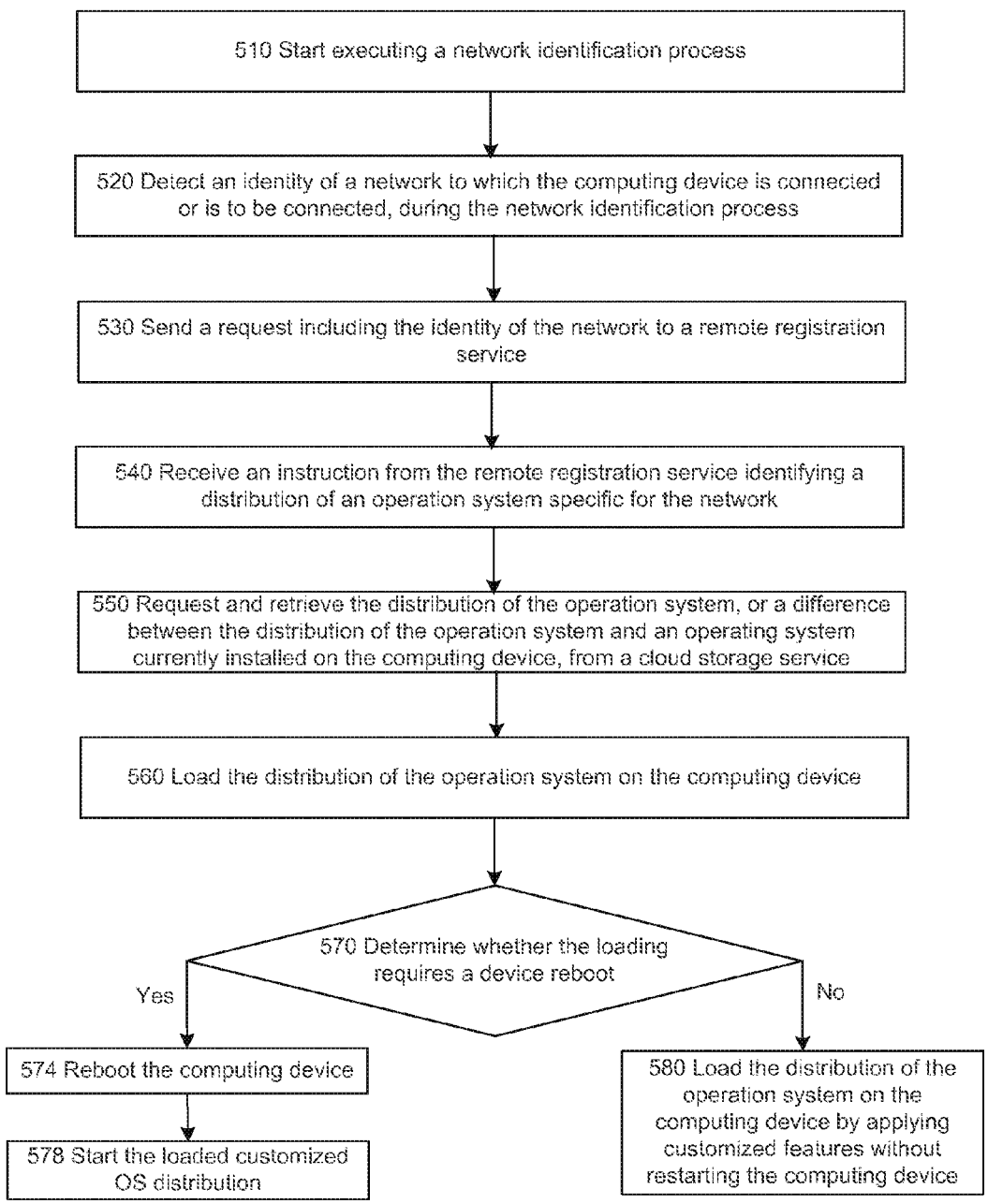
FIG. 5 illustrates an example of an operating system loading process based on the identity of the network.

FIG. 5 illustrates an example of an operating system (OS) loading process 500 based on the identity of the network. The OS loading process 500 starts at step 510, where a computing device starts executing a network identification process. The network identification process can include a device booting process or a network connection process. For instance, the computing device can start booting itself or start connecting a network at step 510. The network identification process can be triggered by various events, e.g., the computing device changing its location, the computing device booting up, a subscriber module of the computing device being replaced or inserted, or a previously scheduled network detecting event. The subscriber module can be a subscriber identification module (SIM) card.

At step 520 of the OS loading process 500, the computing device detects an identity of a network to which the computing device is connected or is to be connected, during the network identification process. The detection of the network can be achieved by examining the subscriber module (e.g. SIM card) electronically connected to the computing device. Alternatively, the detection of the network can be achieved by identifying a radio frequency of the network, or by identifying a service set identification (SSID) of the network or a media access control (MAC) address of a gateway of the network.

Once the network is identified, at step 530, the computing device sends a request including the identity of the network to a remote registration service.

At step 540, the computing device receives an instruction from the remote registration service identifying a distribution of an operating system specific for the network. The instruction from the remote registration service responds to the request that the computer device sends. The instruction can include the location of the distribution of the operating system specific for the network. The distribution of the operating system can be customized based on the identity of the network. Alternatively, the distribution of the operating system can be customized based on both the identity of the network and an identity of a user of the computing device. For instance, the identity of the user can be associated with a corporate account for the user based on the subscriber number of the computing device, the user identity, or the network connected to the computing device.

Based on the received instruction, at step 550, the computing device requests and retrieves the distribution of the operating system, or a difference between the distribution of the operating system and an operating system currently installed on the computing device, from a cloud storage service. In some embodiments, the cloud storage service can share a common cloud service or a common cloud server with the remote registration service. In some alternative embodiments, the cloud storage service can be a dedicated server within the connected network, such as a wireless carrier's network.

After retrieving the OS distribution or the portion of the OS distribution that is different from the currently running OS, at step 560, the computing device loads the distribution of the operating system on the computing device. Such a loading can be a full over-the-air (OTA) update to the operating system that requires a reboot of the computing device. Alternatively, the loading can be an update of OS features (e.g. icons, user interfaces, pre-loaded apps) that does not require a reboot of the computing device.

At step 570, the computing device determines whether the loading requires a device reboot. If the loading requires a device reboot, the computing device reboots the computing device at step 574 and starts the loaded customized OS distribution at 578. If the loading does not require a device reboot, at step 580, the computing device loads the distribution of the operating system on the computing device by applying customized features of the distribution to an operating system currently running on the computing device without restarting the computing device. The customized features can include pre-loaded applications or user interface designs. If the user identity is associated with a corporate account, the computing device can apply user interface settings or load pre-loaded applications specific for the corporate account onto the computing device.

Figure 6:
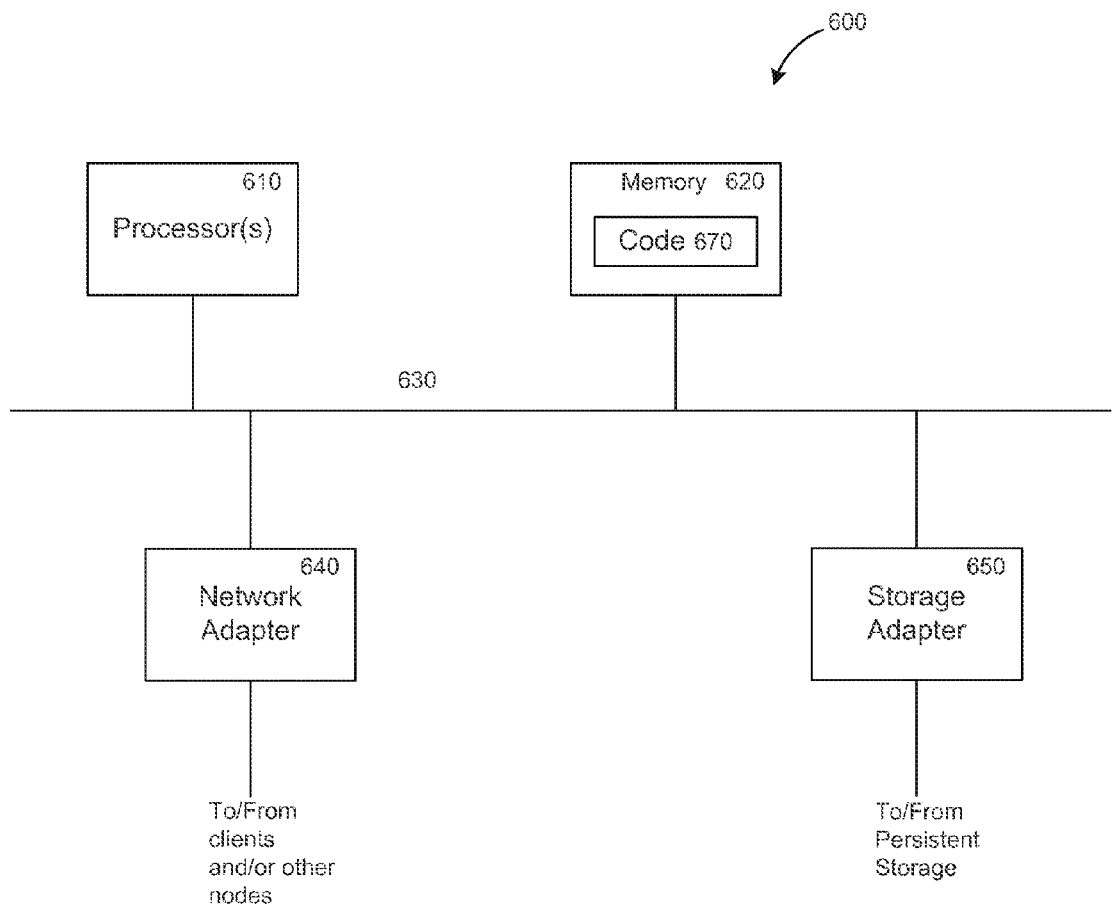
FIG. 6 is a high-level block diagram showing an example of the architecture of a computer device, which may represent any electronic device or any server within a cloud storage service as described herein.

FIG. 6 is a high-level block diagram showing an example of the architecture of a computer, which may represent any electronic device or any server within a cloud storage service as described herein. The server 600 includes one or more processors 610 and memory 620 coupled to an interconnect 630. The interconnect 630 shown in FIG. 6 is an abstraction that represents any one or more separate physical buses, point to point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 610 is/are the central processing unit (CPU) of the server 600 and, thus, control the overall operation of the server 600. In certain embodiments, the processor(s) 610 accomplish this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the server 600. The memory 620 represents any form of random access memory (RAM), read-only memory (ROM), flash memory, or the like, or a combination of such devices. In use, the memory 620 may contain a code 670 containing instructions according to the techniques disclosed herein.

Also connected to the processor(s) 610 through the interconnect 630 are a network adapter 640 and a storage adapter 650. The network adapter 640 provides the server 600 with the ability to communicate with remote devices, over a network and may be, for example, an Ethernet adapter or Fibre Channel adapter. The network adapter 640 may also provide the server 600 with the ability to communicate with other computers. The storage adapter 650 allows the server 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the server 600 by downloading it from a remote system through the server 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A computer-implemented method comprising:
   detecting, by a computing device, an identity of a network to which the computing device is connected or is to be connected, during a network identification process executed on the computing device, wherein the network identification process is triggered by an event of the computing device changing its location, wherein the detecting the identity of a given network to which a given computing device is connected or is to be connected, during a booting process executed on the given computing device, is performed by identifying a radio frequency of the given network;
   identifying, by the computing device, a corporate account for a user of the computing device based on a subscriber number associated with the computing device;
   sending a request including both the identity of the network and the identified corporate account to a remote registration service;

receiving, by the computing device, an instruction from the remote registration service identifying a distribution of an operating system specific for the network, wherein the distribution of the operating system is customized based on the identity of the network and the identified corporate account of the user of the computing device, wherein the instruction from the remote registration service includes a location where the distribution of the operating system is stored;

retrieving from a cloud storage service, by the computing device, a difference between the distribution of the operating system and an operating system currently installed on the computing device;

loading, by the computing device, the distribution of the operating system on the computing device; and applying, by the computing device, user interface settings or loading pre-loaded applications specific for the identified corporate account onto the computing device.

2. The computer-implemented method of claim 1, wherein the network identification process is a device booting process or a network connection process.

3. The computer-implemented method of claim 1, wherein the network identification process is further triggered by an event of a subscriber module of the computing device being replaced, or a scheduled network detecting event.

4. The computer-implemented method of claim 1, wherein the detecting comprises:
detecting, by the computing device, an identity of a network to which a computing device is connected or is to be connected, during a booting process executed on the computing device, by examining a subscriber module electronically connected to the computing device.

5. The computer-implemented method of claim 4, wherein the subscriber module is a subscriber identification module (SIM) card.

6. The computer-implemented method of claim 1, wherein the detecting further comprises:
detecting, by the computing device, the identity of the given network to which a computing device is connected or is to be connected, during a booting process executed on the computing device, by identifying a service set identification (SSID) of the given network or a media access control (MAC) address of a gateway of the given network.

7. The computer-implemented method of claim 1, wherein the loading comprises:
loading, by the computing device, the distribution of the operating system on the computing device by restarting the computing device.

8. The computer-implemented method of claim 1, wherein the loading comprises:
loading, by the computing device, the distribution of the operating system on the computing device by applying customized features of the distribution to an operating system currently running on the computing device without restarting the computing device.

9. The computer-implemented method of claim 8, wherein the customized features include pre-loaded applications or user interface designs.

10. The computer-implemented method of claim 1, the identification of the corporate account for the user further being based on a user identity, or the network connected to the computing device.

11. An electronic device comprising:
a processor;
a network component configured to communicate with a remote registration service;
a memory component storing instructions which, when executed by the processor, cause the electronic device to perform a process including:
detecting an identity of a network to which the electronic device is connected or is to be connected, during a network identification process executed on the electronic device, wherein the network identification process is triggered by an event of the electronic device changing its location, wherein the detecting the identity of a given network to which a given electronic device is connected or is to be connected, during a booting process executed on the given electronic device, is performed by identifying a radio frequency of the given network;
identifying a corporate account for a user of the electronic device based on a subscriber number associated with the electronic device;
sending a request including both the identity of the network and the identified corporate account to a remote registration service;
receiving an instruction from the remote registration service identifying a distribution of an operating system specific for the network, wherein the distribution of the operating system is customized based on the identity of the network and the identified corporate account of the user of the electronic device, wherein the instruction from the remote registration service includes a location where the distribution of the operating system is stored;
loading the distribution of the operating system on the electronic device;
applying user interface settings or loading pre-loaded applications specific for the identified corporate account onto the electronic device; and
a data retrieving component configured to retrieve a difference between the distribution of the operating system and an operating system currently running on the electronic device.

12. The electronic device of claim 11, further comprising:
a circuitry configured to electronically connect to a subscriber identification module (SIM) card such that the identity of the network can be detected by examining the subscriber module.

13. The electronic device of claim 11, further comprising:
a data retrieving component configured to retrieve the distribution of the operating system.

14. A method, comprising:
identifying, by an electronic device, a subscriber module being inserted into the electronic device;
detecting, by the electronic device, an identity of a network to which a computing device is connected or is to be connected, during a network identification process executed on the computing device, wherein the network identification process is triggered by the identified subscriber module;
identifying, by the electronic device, a corporate account for a user of the computing device based on an identity of the subscriber module, the identity of the subscriber module including a subscriber number associated with the subscriber module;
sending, by the electronic device, a request including both the identity of the network and the identified corporate account to a remote registration service;
retrieving from a cloud storage system, by the electronic device, a difference between a distribution of an operating system from the cloud storage system and an operating system currently running on the electronic device, wherein the operating system from the cloud storage system is customized based on the identity of the subscriber module, the operating system from the cloud storage system being customized based on the identity of the network and the identified corporate account associated with the subscriber module;

executing, by the electronic device, the retrieved difference on the electronic device so that the operating system replaces the operating system currently running on the electronic device with the distribution of the operating system from the cloud storage system; and applying, by the electronic device, user interface settings or loading pre-loaded applications specific for the identified corporate account onto the computing device.

15. The method of claim 14, wherein the subscriber module contains identity information of a subscriber of a network.

16. The method of claim 14, wherein the subscriber module includes subscriber information being used to identify a network for the subscriber module.

17. The method of claim 14, further comprising:

determining, by the electronic device, an identity of the user of the subscriber module based on the information in subscriber module; and sending, by the electronic device, a request including the identity of the user to a registration server, wherein the registration server determines an operating system for the user.

18. The method of claim 14, further comprising:

determining, by the electronic device, an identity of an organization owning the subscriber module based on information in the subscriber module; and sending, by the electronic device, a request including the identity of the organization to a registration server, wherein the registration server determines an operating system for the organization.

* * * * *